UNITED STATES PATENT OFFICE.

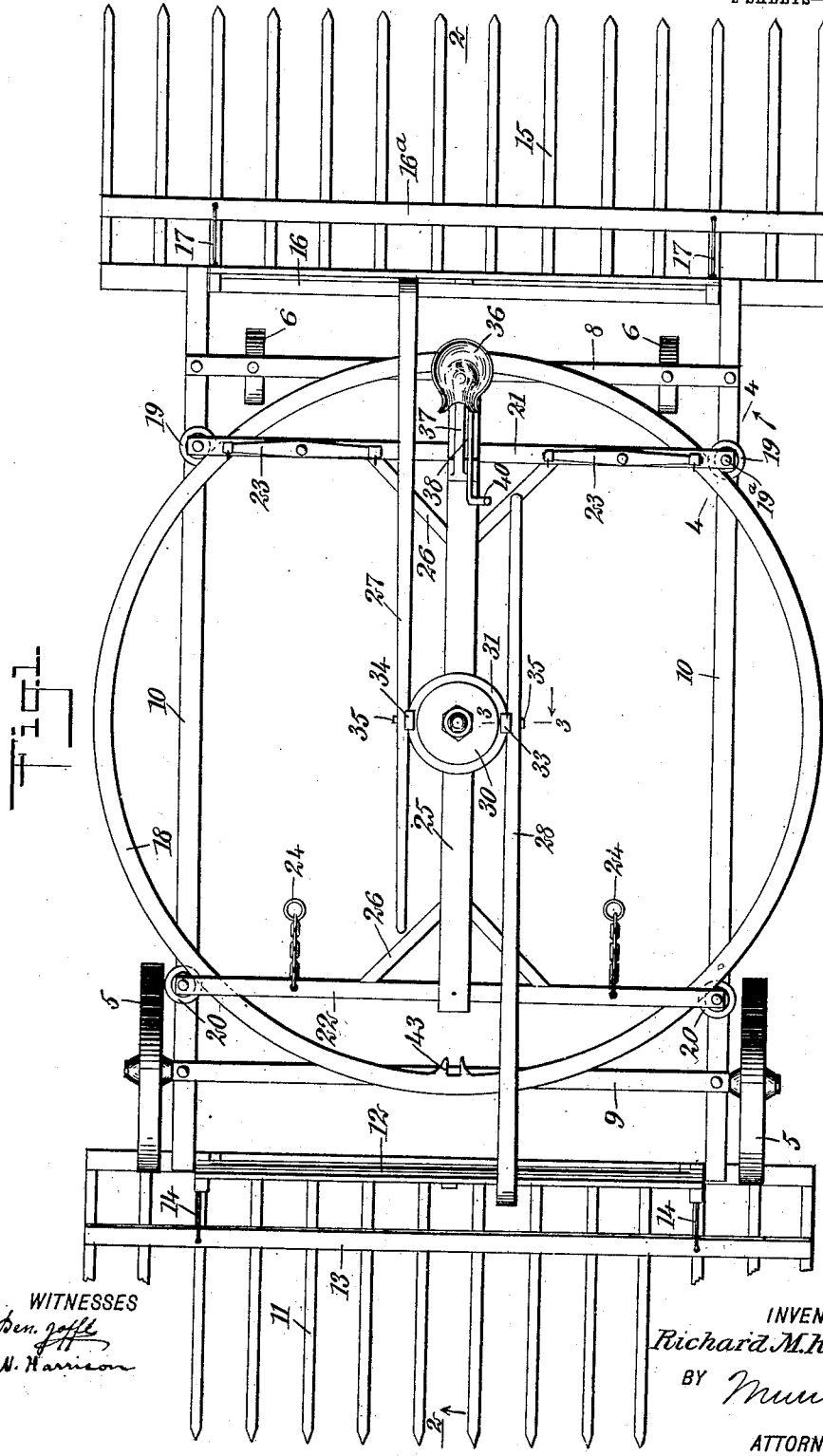

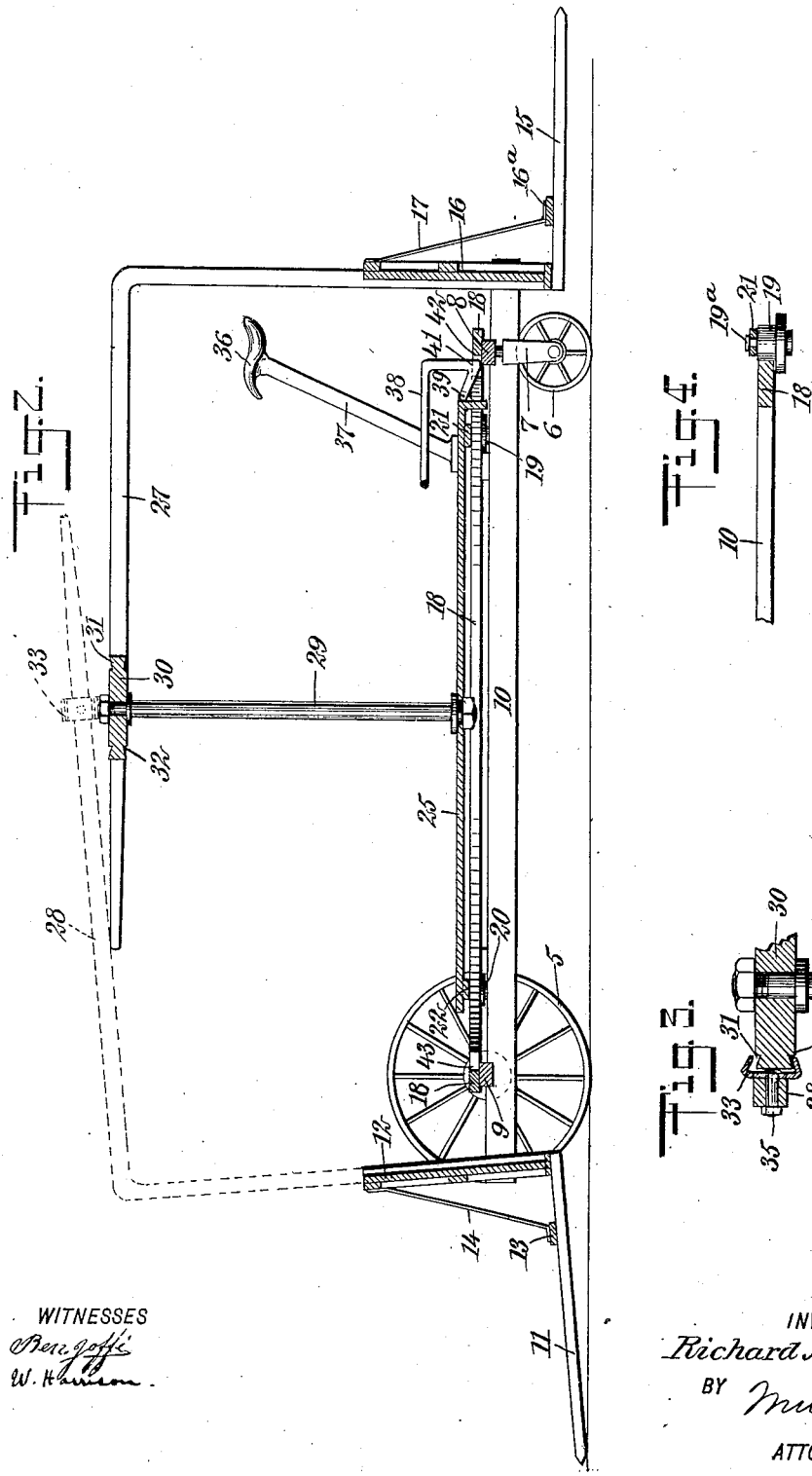

RICHARD M. KENNEY, OF CLINTON, OKLAHOMA.

DOUBLE RAKE.

No. 909,607.      Specification of Letters Patent.      Patented Jan. 12, 1909.

Application filed April 25, 1908. Serial No. 429,182.

*To all whom it may concern:*

Be it known that I, RICHARD M. KENNEY, a citizen of the United States, and a resident of Clinton, in the county of Custer and State of Oklahoma, have invented a new and Improved Double Rake, of which the following is a full, clear, and exact description.

My invention relates to rakes, my more particular purpose being to provide a vehicle body with two sets of rake teeth operated to some extent independently, and to further provide the vehicle body with a turntable whereby the horses used for drawing the vehicle body may be turned around without materially disturbing the relative positions of the rake members, so that one of the rake members may be filled and afterward practically turned to the rear in order to allow the other one to be filled.

Reference is to be had to the accompanying drawings forming a part of this specification, in which similar characters of reference indicate corresponding parts in all the figures.

Figure 1 is a plan view of the device complete, this view showing the vehicle body provided at its front and at its rear with oppositely disposed rake members which are operated, one at a time, to a great extent independently of each other; Fig. 2 is a longitudinal vertical section upon the line 2—2 of Fig. 1, looking in the direction of the arrow, and showing the center post, the driver's seat, the turntable, and means for temporarily locking the turntable in predetermined positions; Fig. 3 is an enlarged fragmentary detail showing in section upon the line 3—3 of Fig. 1, looking in the direction of the arrow, the center wheel used as a fastening for securing the operating levers in their respective normal positions; and Fig. 4 is also a detail, showing in section upon the line 4—4 of Fig. 1, looking in the direction of the arrow, one of the rollers forming a part of the turntable, and also showing the large metallic circle also comprising a part of said turntable.

A pair of service wheels 5 of large diameter, and another pair of service wheels 6, the latter being of smaller diameter, serve to support practically all of the other parts. The wheels 6 are mounted in forks 7 after the manner of casters. These forks are mounted upon a cross beam 8 which thus forms a type of axle. The wheels 5 are mounted upon an axle 9. A pair of bars 10 extending longitudinally of the device are secured to the axles 8, 9 so as to form a rigid framework.

A number of rake teeth 11 are connected with a rocking head 12 and are also connected together by a cross bar 13, the latter being secured to the rocking head 12 by aid of brace rods 14. The parts 11, 12, 13, 14 together constitute a rake member. Similarly, rake teeth 15, a rocking 16, cross bar 16ª and brace rods 17 together constitute another rake member, these two rake members being disposed at opposite extremities of the frame.

A metallic circle 18, having in cross section the form of a flat bar, rests upon the framework and is secured rigidly thereto. Two rollers 19, each of the form indicated in Fig. 4, are mounted upon pins 19ª carried by a bar 21. Two other rollers 20 engage the circle 18. The rollers 19 are mounted upon the bar 21, and the rollers 20 are similarly mounted upon the ends of a bar 22. Swingletrees 23 are pivotally mounted upon the bar 21 and are the instrumentalities whereby the vehicle is moved along the road or through the field.

Breast chains 24 are connected with the bar 22 and are secured to the harnesswork in order to enable the horses or other draft animals, to pull backward when desirable. A center bar 25 is connected by braces 26 with the cross bars 22, 21. Hand levers 27, 28 are connected respectively with the rocking heads 16, 12 of the rake members above described and are used independently for raising and lowering these rake members.

A center post 29 is mounted upon the center bar 25 and revolubly mounted upon the upper end of the center post is a wheel 30, the purpose of which is to hold either or both of the levers 27, 28 in their normal positions. This wheel is provided with annular steps 31, 32 which are engaged by metallic clips 33, 34, the latter being mounted upon the levers 28, 27. These clips are secured in position by aid of bolts 35, as will be understood from Fig. 3. The driver's seat is shown at 36 and is mounted upon a stem 37, the latter extending obliquely upward from the center bar 25. A lever 38 is mounted upon a pivot 39 and is provided with a foot rest 40 whereby the lever is actuated. The lever is further provided with a latch 41 which is adapted to move into either of two slots 42, 43, for the purpose of holding the turntable rigid in relation to the framework.

The operation of my device is as follows: The horses or other draft animals are provided with harness and the harness is connected with the swingletrees 23 and with the breast chains 24. The driver sits upon the seat 36 and can manipulate either or both of the hand levers 27, 28 at will. When the device is to be moved along the road after the manner of a wagon, the levers 27, 28 are drawn into such position that the clips 33, 34 engage the steps 32 (see Fig. 3). They can, moreover, be steadied by hand, if desired. Normally the rake teeth 11, 15 are horizontal, as indicated at the right in Fig. 2, the levers 27 being connected by the clips 33, 34, with the wheel 30. Suppose, now, that the device is being moved along through the field, and that the operator wishes to gather up hay or the like, by aid of the rake member in front, say the one at the left of Fig. 2. He releases the hand lever 28 from the wheel 30 and this allows the teeth 11 to incline toward the ground. The vehicle being moved forward, the rake member is filled with hay or other substance to be operated upon. The driver now grasps the hand lever 28 and brings it into such position (see Fig. 3) that the clip 33 rests in the step 32. This maintains the teeth 11 substantially horizontal and enables them to support the load of hay or other material. The operator may now, if he desires, bring into use the rake member at the other end of the vehicle, and provided with the rake teeth 15. He places his foot upon the foot rest 40, thereby moving the lever 38 and withdrawing the latch 41 from the slot 42. By causing one of the draft animals to go ahead and the other to back, he turns the movable member consisting of the bars 21, 22, center bar 25 and parts immediately associated therewith. The parts just mentioned constitute the movable elements of the turntable. The levers 27, 28 do not move but are of sufficient height (see Fig. 2) to enable the draft animals to walk around. The turntable makes a half turn which carries the driver's seat from the point which it occupies at the right of Fig. 1 to the point immediately opposite, or at the left of Fig. 1. The latch 41 clicks into the slot 42 and holds the movable elements of the turntable in the position which it now occupies. The driver now has in front of him the rake member shown at the right of Fig. 1. Next by locking this rake member by aid of the hand lever 27 and driving the draft animals ahead the rake member in question is filled with hay or other substance to be operated upon. This being done, the hand lever 27 is brought down and secured to the wheel 30. Both rake members now being filled are ready for a trip to the hay rick.

Having thus described my invention, I claim as new and desire to secure by Letters Patent:

1. The combination of a vehicle body, rake members mounted one upon the rear and the other upon the front of said vehicle body, and mechanism controllable at will for actuating said rake members independently of each other.

2. The combination of a vehicle body, rake members mounted one upon the rear and the other upon the front thereof and provided with rake teeth extending in opposite directions, a hand lever for each of said rake members, and means for holding said hand levers independently of each other in predetermined normal positions.

3. The combination of a vehicle body, rake members disposed upon opposite sides thereof, a turntable mounted upon said vehicle body, mechanism connected with said turntable for the purpose of facilitating the attachment of harness thereto in order to enable the vehicle to be moved, and means controllable at will for temporarily holding said turntable rigid relatively to said vehicle body.

4. The combination of a vehicle body, a circular member mounted thereupon and forming one element of a turntable, a second member of said turntable movable in relation to said first-mentioned member and provided with rollers engaging the latter, rake members mounted upon different portions of said vehicle body, and mechanism for actuating said rake members independently of each other.

5. The combination of a vehicle body mounted upon service wheels, rake members mounted upon different portions of said vehicle body, a turntable mounted upon said vehicle body and comprising a member fixed relatively to said vehicle body and another member movable relatively to said vehicle body, a driver's seat mounted upon the movable member of said turntable, and mechanism controllable from said seat for raising and lowering said rake members independently of each other.

In testimony whereof I have signed my name to this specification in the presence of two subscribing witnesses.

RICHARD M. KENNEY.

Witnesses:
A. J. WELCH,
C. G. WELCH.